United States Patent [19]

Maher et al.

[11] Patent Number: 5,450,405
[45] Date of Patent: Sep. 12, 1995

[54] METHOD FOR ESTABLISHING AND MAINTAINING COMMUNICATION PROCESSING INFORMATION FOR A GROUP CALL

[75] Inventors: John W. Maher, Woodstock; James C. Duran, Schaumburg, both of Ill.

[73] Assignee: Motorola, Inc., Schaumburg, Ill.

[21] Appl. No.: 42,225

[22] Filed: Apr. 2, 1993

[51] Int. Cl.⁶ .................. H04J 3/12; H04L 12/18; H04L 12/52
[52] U.S. Cl. .................. 370/58.2; 370/62; 370/85.13; 370/94.3; 370/95.1; 370/110.1; 379/59; 379/63; 379/202; 340/825.47; 455/33.1; 455/53.1
[58] Field of Search .................. 370/16, 54, 58.1–58.3, 370/62, 77, 79, 80, 85.1, 85.7, 85.13, 94.1, 951, 110.1, 112, 94.3; 340/825.03, 825.06, 825.15, 825.22, 825.44, 825.47; 379/58, 59, 61, 63, 158, 202; 455/33.1, 34.1, 49.1, 53.1, 54.1, 542, 56.1

[56] References Cited

U.S. PATENT DOCUMENTS

| | | | |
|---|---|---|---|
| 5,101,502 | 3/1992 | Felderman et al. | 455/34.1 |
| 5,123,110 | 6/1992 | Grube | 455/33.1 |
| 5,175,727 | 12/1992 | Maher et al. | 370/58.1 |
| 5,210,746 | 5/1993 | Maher et al. | 370/79 |
| 5,228,038 | 7/1993 | Jestice et al. | 370/110.1 |
| 5,274,630 | 12/1993 | Jestice et al. | 370/58.1 |

*Primary Examiner*—Alpus H. Hsu
*Attorney, Agent, or Firm*—Timothy W. Markinson

[57] ABSTRACT

When a group communication group call is initiated in a multi-site communication system, the communication processing information for that particular communication group call must be established. The communication processing information is formatted by a central controller which in turn transfers that information to a destination data base of a processing multiplexer switch. The information is then stored in the destination data base such that the particular communication group call may be quickly processed. When the communication unit that initiated the call ceases to transmit and another communication unit begins to transmit, the communication processing information is updated to reflect the change in the transmitting communication unit. This continues to happen until the particular communication group call has ended; once it has ended, the communication processing information is deleted from the destination data base.

22 Claims, 3 Drawing Sheets

METHOD FOR ESTABLISHING AND MAINTAINING COMMUNICATION PROCESSING INFORMATION FOR A GROUP CALL

TECHNICAL FIELD OF THE INVENTION

This invention relates generally to communication systems and, in particular, to establishment and maintenance of communication processing information for a group call.

BACKGROUND OF THE INVENTION

Communication systems are known to comprise a plurality of communication units arranged into communication groups, a limited number of communication resources, and a communication resource allocator. The communication resource allocator allocates the communication resources, as voice channels, to particular communication groups upon a request from one of the communication units in the group. The communication unit makes the group call request by transmitting a group call request to the communication resource allocator via a control channel, wherein the control channel is one of the limited number of communication resources which transceives communication system information between the plurality of communication units and the communication resource allocator. (Note that a communication resource may be a carrier frequency, a pair of carrier frequencies, a time division multiplex (TDM) slot, or any other RF medium.) When a voice channel is allocated to the particular communication group, every member of the group may participate in the communication via the allocated voice channel. When the group call ends for the particular group, the voice channel is de-allocated such that it may be allocated to another communication group.

In recent years, technological advances have allowed several communication systems to be linked together via a central controller to form a communication system network. In the communication system network, the central controller allocates the communication resources in each communication system (or communication site) to the communication groups. Thus, a communication group call may be established in several communication systems such that the members of the communication group may be located in any one of the communication systems and still participate in the group call. For example, if the communication system network comprises four communication systems, wherein a member of a particular talk group is located in each communication system, a communication resource will be allocated in each system to the group. The central controller will then link the allocated communication resources together such that the group call may occur throughout the communication system network.

Even more recently, technological advances now allow, during a communication group call, multiple communication units to talk at one time and have their audio summed together by a processing multiplexer switch. The processing multiplexer switch is fully described in U.S. Pat. No. 5,175,727, assigned to Motorola. However, the use of the processing multiplexer switch with the communication system network is presently being designed and requires establishment of communication processing information by the central controller of the communication system network; wherein the communication processing information includes information of the sourcing (transmitting) communication unit, or units, and information of the destination (receiving) communication unit, or units. This information needs to be transferred to the processing multiplexer switch and must take place in a relatively short period of time such that no noticeable delay is detected by the operators of the communication units. Therefore, a need exists for a method that allows communication processing information to be transferred between the central controller of the communication system network and the processing multiplexer switch.

DETAILED DESCRIPTION OF A PREFERRED EMBODIMENT

Generally, within a multi-site communication system, the present invention provides a method for providing communication processing information from a central controller to a processing multiplexer. The central controller generates the communication processing information when a communication group call is requested by a member of a particular communication group. The communication processing information comprises the site location of the source communication unit, or units, (the communication unit or units that will source audio), the site location of the destination communication units (the communication units that will receive the audio), and the identity of the communication channels that will be used at each site that has a source or destination communication unit located within it. Once the communication processing information is generated, it is transferred to, and stored by, the processing multiplexer. The processing multiplexer uses the information to set up audio routing for the source and destination communication units. When a new communication unit begins to source audio, the central controller must generate new, or subsequent, communication processing information indicating the new communication unit as the source communication unit. This process of generating new communication processing information continues until the communication group call ends, at this, the communication processing information is deleted from the processing multiplexer.

Figure 1:
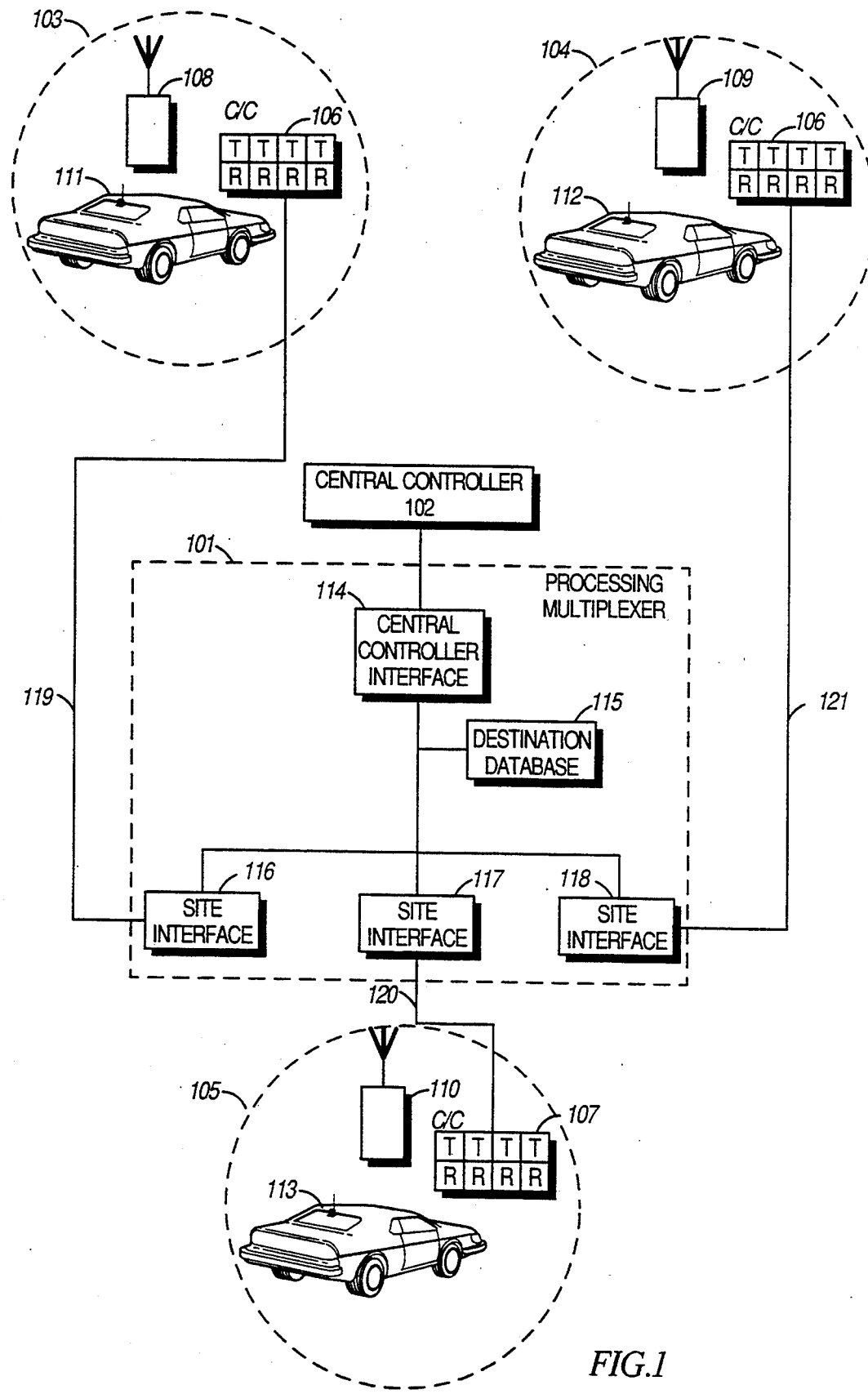
FIG. 1 illustrates a communication system network coupled to a processing multiplexer switch in accordance with the present invention.

The present invention can be more fully described with reference to FIGS. 1 and 2A–2B. FIG. 1 illustrates a multi-site communication system that comprises a central controller (102), a processing multiplexer (101), and a plurality of sites (103–105). The processing multiplexer (101) comprises a central controller interface (114), a destination database (115), and a plurality of site interfaces (116–118). Each site interface (116–118) is linked to a respective site (103–105) via a communication link (119–121), wherein each site (103–105) comprises a plurality of communication channels (106–107) and a plurality of communication units (108–113).

The communication units referenced as (108–110) are shown as portable radios such as Motorola STX 800 series portable trunking radio, while the communication units referenced as (111–113) are shown as mobile radios such as Motorola Spectra Series mobile trunking radio. In addition, the communication units (108–113) may be arranged into communication groups, or talk groups. For example, the communication units referenced as (108, 112 and 113 ) may form one talk group, talk group A, while the communication units referenced as (109, 110 and 111 ) may form another talk group, talk group B.

The site interfaces (116–118) and the destination database (115) of the processing multiplexer (101) are described in U.S. Pat. No. 5,175,727, entitled A Communications System Network, and assigned to Motorola Inc., which is incorporated herein. In the '727 patent, the site interfaces are referred to as ambassador boards and the destination database, as individual destination databases, is located within each of the ambassador boards. The '727 does not describe the central controller interface (114) which may be a Zone Controller/Ambassador Interface Module manufactured by Motorola, Inc. The central controller interface (114) provides a data communication path between the central controller (102) and the processing multiplexer (101) to route communication processing information from the central controller (102) to the destination database (115), such that the destination database (115) may store the communication processing information.

The central controller (102) and the general operation of a multi-site communication system (100) are described in U.S. Pat. No. 5,123,110, entitled Smart-Zone Critical Sites/Users and U.S. Pat. No. 5,101,502, entitled Busy Override. Both patents are assigned to Motorola Inc.

Figure 2A:
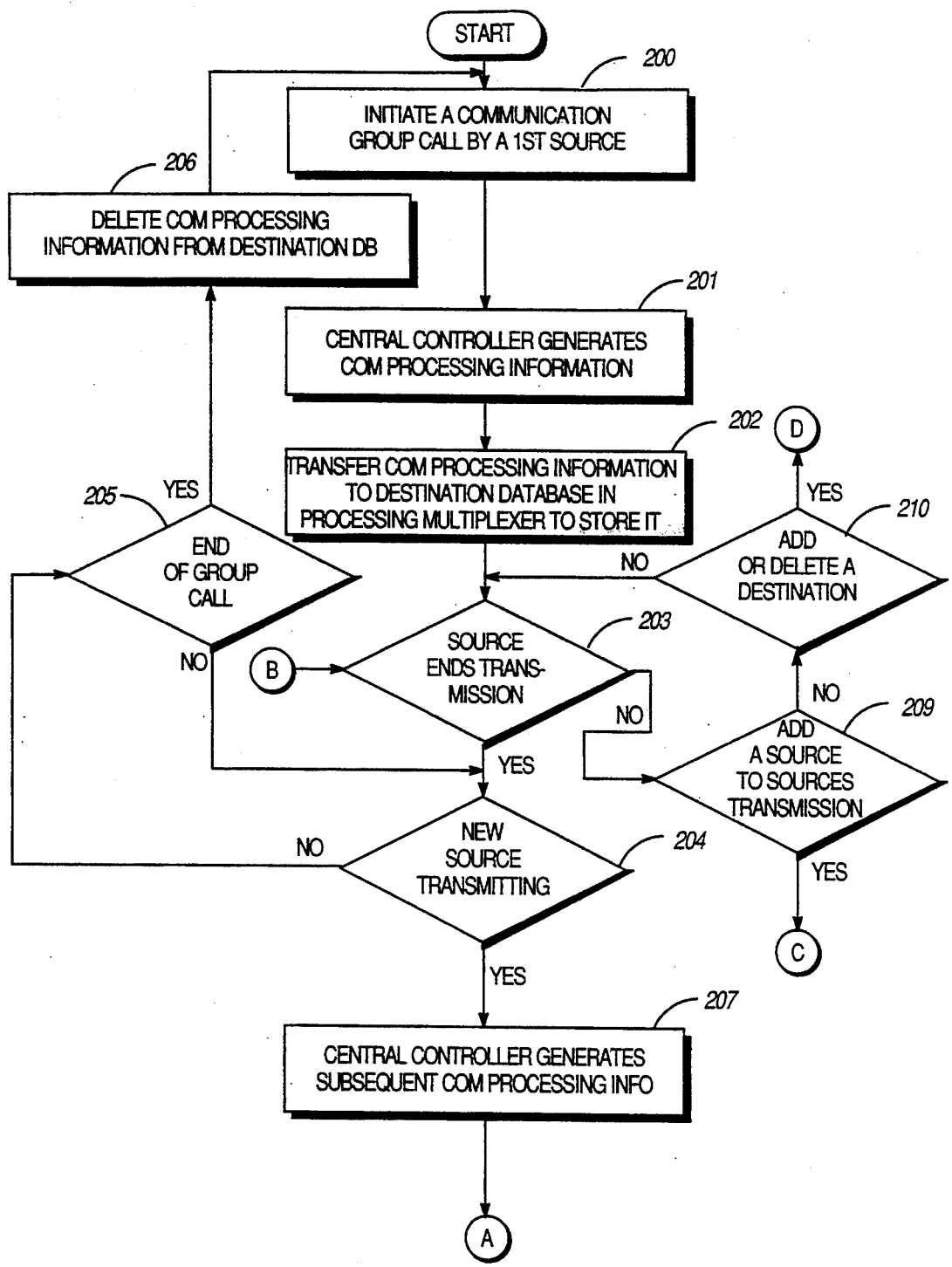
FIGS. 2A–2B illustrate a logic diagram that may be used to implement the present invention.
Figure 2B:
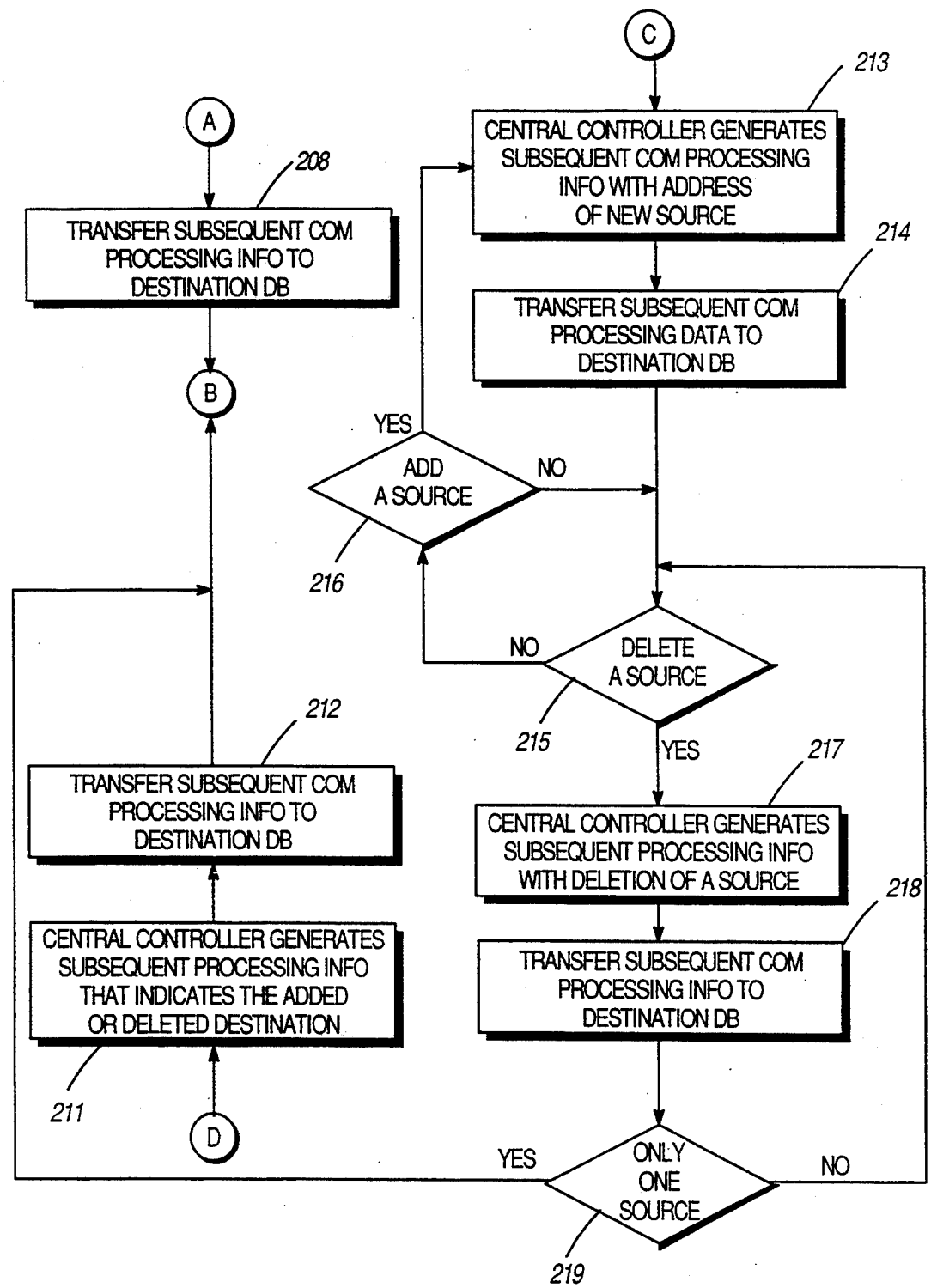

FIGS. 2A–2B illustrate a logic diagram for transferring communication processing information from the central controller (102) to the processing multiplexer (101 ). At step 200, a communication group call is initiated when a communication unit (108–113) of a particular communication group requests a communication group call. Requesting and processing a communication group call is known, thus no further discussion will be presented except to illustrate the present invention. When the central controller receives the request, the central controller (102) determines whether the communication group call may be established, i.e. does every site that has a member of this particular communication group located within it have an available resource. If every site has an available resource, or a site busy override is established (see U.S. Pat. No. 5,101,502), the central controller generates (201) and transfers (202) communication processing information to the processing multiplexer, such that the information may be stored by the destination database.

The communication processing information comprises a header and a data section, wherein the header contains the address of the central controller and the data section contains source information, destination information and a command message. The source information includes site location (site address) of the source communication unit, or units, (the communication unit or units that will source audio) and the identity of the communication resource that will be used in the site containing the source communication unit. The destination information includes site location (site address) of the destination communication units (the communication units that will receive the audio), and the identity of the communication channels that will be used at each site that has a destination communication unit located within it. The command message may be connection set up, change audio source, add single source, delete single source, connection takedown, or connection takedown with loop back. For this step, the command message is connection set up.

Once the communication processing information is stored in the destination database and audio paths established by the processing multiplexer, the source communication unit audio is routed to the destination communication units. (Note that the destination communication units and the source communication unit are part of the same communication group.) When the source communication unit stops transmitting audio, i.e. sends an end of transmission message (203), the central controller determines whether another communication unit is sourcing audio (204) or has the communication group call ended (205). The end of transmission message is generated when the user of the communication unit releases the push-to-talk switch on the unit, which is known, thus no further discussion will be presented except to further illustrate the present invention.

If the communication group call has ended (205), the central controller sends communication processing information, which indicates an end of the communication group call, to the processing multiplexer, where, upon receipt, the processing multiplexer deletes the existing communication processing information stored in the destination database (206). The format of the communication processing information includes a header section, which indicates the address of the central controller, and a data section, which includes the source information, the destination information and the Connection Take Down command.

If the communication group call has not ended (205), but a new source is transmitting (another communication unit in the communication group is sourcing audio (204), the central controller (102) generates subsequent communication processing information based on the new sourcing communication unit (207). The subsequent communication processing information consists of a header section, which includes the address of the central controller, and a data section, which includes subsequent source information, destination information and the change audio source command. The subsequent source information comprises site location, site address, of the former source communication unit and the site address of the new audio source communication unit. The destination information remains unchanged, unless a destination change occurs, which will be discussed below. The subsequent communication processing information is then transmitted to the processing multiplexer, wherein the destination database overwrites the old communication processing information with the subsequent communication processing information (208). Having stored the information, the process proceeds to step 203.

If, while a source communication unit is transmitting audio, the central controller determines that a destination is to be added or deleted (210), the central controller generates subsequent communication processing information (211 ). A destination may be added when a site that previously did not have any members of the communication group located within it, now has a communication unit of the communication group in it. Similarly, a site is deleted as a destination when a site that had a member of the communication group located in it, leaves the site. The determination of a unit being located or not located within (i.e. registered or de-registered) a site is known, thus, no further discussion will be presented except to further illustrate the present invention.

The subsequent communication processing information includes a header section, which contains the address of the central controller, and a data section, which contains source information, subsequent destination information, and the command Connection Set Up or Connection Take Down. The subsequent destination information includes the site addresses of the sites having destination communication units located within it and add or delete destination information, which indicates the site address that was added or deleted. Once the subsequent processing communication information has been formatted, it is transferred to the destination database (212), which overwrites the previously stored communication processing information with the subsequent communication processing information. Having stored the information, the process proceeds to step 203.

If, while a source communication unit is transmitting audio, another communication unit of the same communication group requests to simultaneously transmit audio, i.e. creating a conference communication group call, (209) the central controller generates subsequent communication processing information (213). A conference communication group call is defined as a communication group call with more than one source communication unit capable of transmitting audio simultaneously. The subsequent communication processing information includes a header section, which contains the address of the central controller, and a data section, which contains subsequent source information, the destination information and the Add Single Source command. The subsequent source information includes the site address of the currently transmitting source communication unit and the site address of the new source communication unit, while the destination information remains the same, unless a destination change occurred as well (see above). Once the subsequent communication processing information has been formatted, it is sent to the destination database (214), which overwrites the previously stored communication processing information with the subsequent communication processing information. Having stored the information, the process repeats at step 203.

While the conference communication group call is occurring, the central controller determines whether a sourcing communication unit is to be added (216) or deleted (215) from the conference call. If a source communication unit is added (216), the process repeats at step 213. If, however, a source communication unit is deleted (215), the central controller generates subsequent communication processing information (217). The subsequent communication processing information includes a header section, which contains the address of the central controller, and a data section, which contains subsequent source information, the destination information and the Remove Single Source command. The subsequent source information includes the site address of the source communication unit that is being deleted and the site address of the other source communication unit(s), while the destination information remains the same, unless a destination change occurred as well (see above). Once the subsequent communication processing information has been formatted, it is sent to the destination database (218), which overwrites the previously stored communication processing information with the subsequent communication processing information.

Once the subsequent communication processing information has been stored by the destination database (218), the central controller (102) determines whether there is only one source communication unit left in the conference communication group call. If so, the process continues at step 203, and if not, the process continues at step 215.

To further illustrate the present invention consider the following example of a communication group call having only a single source communication unit transmitting audio at any given time. For this example, assume that communication unit (108) is the requesting and original source communication unit and is in communication group A along with communication units (112 and 113). When the central controller (102) receives the request from the communication unit (108), it determines which sites have members of communication group A within it. The central controller (102) determines that each site (103-105) has a member of communication group A within (see FIG. 1 ) and allocates a communication resource in each site for the communication group A. Having done this, the central controller (102) generates the communication processing information which contains a header, which includes the address of the central controller, and a dam section, which includes source information, destination information, and the command Connection Set Up. The source information contains the address of the site (103), which is where the source communication unit (108) is located and the communication resource to be used, while the destination information contains the addresses of all three sites (103-105) and the communication resource to be used in each of the sites. Note that there may be a destination communication unit in the same site as the source communication unit.

The communication processing information is transferred to the processing multiplexer (101) via the central controller interface link (118), and is distributed to the destination database (115) by the central controller interface (114). The processing multiplexer uses this information to establish audio connections such that all member of group A can participate in the group call.

At a later point in time, communication unit (108) finishes talking, and within a known response time, communication unit (112) decides to respond to the communication group call. When this occurs, the central controller (102) determines that a new audio source exists for the communication group call and generates subsequent communication processing information. The subsequent communication processing information includes the site address of site (104) (the site in which communication unit (112) is located in), the site address of site (103) (the site in which communication unit (108) is located in), the destination information, and the command Change Audio Source. specifying the address of the former audio source at site (103), The subsequent communication processing information is transferred to the processing multiplexer (101) and is stored in the destination database (115), recording a new audio source for the communication group call. At this point, all of the site interfaces (116-118) are directed to route the new audio source to the respective audio destinations at each site. All of the destination communication units (108 and 113 ) can hear communication unit (112) talking. This process, i.e. changing source communication units, continues until the group call ends, a site no longer has a member of the group A located within, a new site has a member of the group A located within, or a conference call is established. From the above discussion regarding FIG. 2, it is obvious to one of average skill in the art, how these events are processed.

This invention defines a method for establishing and maintaining communication processing information for a particular communication group call. This method uses a single audio source, multiple audio destination communication processing information command format. This allows the central controller (102) to quickly set up and take down audio connections for many sites with one communication processing information command.

We claim:

1. In a multi-site communication system that includes a plurality of sites, a central controller, a plurality of communication units that are arranged into communication groups, and a processing multiplexer, wherein the processing multiplexer includes a central controller interface and a destination database, and a plurality of site interfaces, wherein the processing multiplexer is operably coupled to each of the plurality of sites and the central controller, a method for establishing and maintaining communication processing information for a particular communication group call, the method comprises the steps of:
   a) when the particular communication group call is initiated, formatting, by the central controller, communication processing information, wherein the communication processing information includes source information, destination information, and a set up command;
   b) transferring, by the central controller interface, the communication processing information from the central controller to the plurality of site interfaces;
   c) storing, by at least one of said plurality of site interface, the communication processing information in the destination database;
   d) when a source change occurs, generating, by the central controller, subsequent communication processing information based on the source change, wherein the subsequent communication processing information includes subsequent source information, the destination information and a change source command;
   e) transferring, by the central controller interface, the subsequent communication processing information from the central controller to the destination database; and
   f) overwriting, by at least one of said plurality of site interfaces, portions of the communication processing information, in the destination database, with portions of the subsequent communication processing information that have changed from the communication processing information.

2. The method of claim 1 further comprises the step of adding; by at least one of said plurality of site interfaces, destination information of a new destination to the communication processing information.

3. The method of claim 1 further comprises the step of deleting, by at least one of said plurality of site interfaces, destination information of a destination from the communication processing information.

4. The method of claim 1 further comprises the step of:
   when the particular communication group call ends, deleting, by at least one of said plurality of site interfaces, the communication processing information and the portions of the subsequent communication processing information from the destination database.

5. The method of claim 1 further comprises the step of adding, by at least one of said plurality of site interfaces, source information of a new source to the communication processing information such that the new source is added to a conference call.

6. The method of claim 5 further comprises the step of deleting, by at least one of said plurality of site interfaces, source information of a deleted source from the communication processing information such that the deleted source is deleted from the conference call.

7. In a multi-site communication system that includes a plurality of sites, a central controller, a plurality of communication units that are arranged into communication groups, and a processing multiplexer, wherein the processing multiplexer includes a central controller interface and a destination database, and a plurality of site interfaces, wherein the processing multiplexer is operably coupled to each of the plurality of sites and the central controller, a method for establishing and maintaining communication processing information for a particular communication group call, the method comprises the steps of:
   a) when the particular communication group call is initiated by a first communication unit, formatting, by the central controller, communication processing information, wherein the communication processing information includes at least an address of a site that the first communication unit is located in, an address of at least one destination site, and a set up command;
   b) transferring, by the central controller interface, the communication processing information from the central controller to the plurality of site interfaces;
   c) storing, by at least one of said plurality of site interfaces, the communication processing information in the destination database;
   d) when the first communication unit stops transmitting and a second communication unit begins to transmit, generating, by the central controller for each of the at least one destination site, subsequent communication processing information, wherein the subsequent communication processing information includes an address of a site that the second communication unit is located in, the address of the at least one destination site, and the address of the site that the first communication unit is located in;
   e) transferring, by the central controller interface, the subsequent communication processing information from the central controller to the destination database; and
   f) overwriting, by at least one of said plurality of site interfaces, portions of the communication processing information, in the destination database, with portions of the subsequent communication processing information that have changed from the communication processing information.

8. The method of claim 7 further comprises the step of adding, by at least one of said plurality of site interfaces, an address of a new destination site to the communication processing information.

9. The method of claim 7 further comprises the step of deleting, by at least one of said plurality of site interfaces, an address of a destination site from the communication processing information.

10. The method of claim 7 further comprises the step of:

when the particular communication group call ends, deleting, by at least one of said plurality of site interfaces, the communication processing information and the portions of the subsequent communication processing information from the destination database.

11. In a multi-site communication system that includes a plurality of sites, a central controller, a plurality of communication units that are arranged into communication groups, and a processing multiplexer, wherein the processing multiplexer includes a central controller interface and a destination database, and a plurality of site interfaces, wherein the processing multiplexer is operably coupled to each of the plurality of sites and the central controller, a method for the central controller to provide communication processing information of a particular communication group call to the destination database, the method comprises the steps of:

a) when the particular communication group call is initiated, formatting, by the central controller, communication processing information, wherein the communication processing information includes source information, destination information, and a set up command;

b) transferring, by the central controller interface, the communication processing information from the central controller to the plurality of site interfaces;

c) storing, by at least one of said plurality of site interfaces, the communication processing information in the destination database;

d) when a source change occurs, generating, by the central controller, subsequent communication processing information based on the source change, wherein the subsequent communication processing information includes subsequent source information, the destination information and a change source command;

e) transferring, by the central controller interface, the subsequent communication processing information from the central controller to the destination database; and f) overwriting, by at least one of said plurality of site interfaces, portions of the communication processing information, in the destination database, with portions of the subsequent communication processing information that have changed from the communication processing information.

12. The method of claim 11 further comprises the step of adding, by at least one of said plurality of site interfaces, destination information of a new destination to the communication processing information.

13. The method of claim 11 further comprises the step of deleting, by at least one of said plurality of site interfaces, destination information of a destination from the communication processing information.

14. The method of claim 11 further comprises the step of:

when the particular communication group call ends, transmitting, by at least one of said plurality of site interfaces, a delete communication processing information message to the destination database such that the communication processing information and the portions of the subsequent communication processing information are deleted from the destination database.

15. The method of claim 11 further comprises the step of adding, by at least one of said plurality of site interfaces, source information of a new source to the communication processing information such that the new source is added to a conference call.

16. The method of claim 15 further comprises the step of deleting, by at least one of said plurality of site interfaces, source information of a deleted source from the communication processing information such that the deleted source is deleted from the conference call.

17. In a multi-site communication system that includes a plurality of sites, a central controller, a plurality of communication units that are arranged into communication groups, and a processing multiplexer, wherein the processing multiplexer includes a central controller interface and a destination database, and a plurality of site interfaces, wherein the processing multiplexer is operably coupled to each of the plurality of sites and the central controller, a method for the processing multiplexer to maintain communication processing information in the destination database for a particular communication group call, the method comprises the steps of:

a) when the particular communication group call is initiated, receiving communication processing information from the central controller, wherein the communication processing information includes source information, destination information, and a set up command;

b) storing, by at least one of said plurality of site interfaces, the communication processing information in the destination database;

c) when a source change occurs, receiving subsequent communication processing information based on the source change from the central controller, wherein the subsequent communication processing information includes subsequent source information, the destination information and a change source command; and d) overwriting, by at least one of said plurality of site interfaces, portions of the communication processing information, in the destination database, with portions of the subsequent communication processing information that have changed from the communication processing information.

18. The method of claim 17 further comprises the step of adding, by at least one of said plurality of site interfaces, destination information of a new destination to the communication processing information.

19. The method of claim 17 further comprises the step of deleting, by at least one of said plurality of site interfaces, destination information of a destination from the communication processing information.

20. The method of claim 17 further comprises the step of:

when the particular communication group call ends, receiving, by at least one of said plurality of site interfaces, a delete communication processing information message to the destination database such that the communication processing information and the portions of the subsequent communication processing information are deleted from the destination database.

21. The method of claim 17 further comprises the step of adding, by at least one of said plurality of site interfaces, source information of a new source to the communication processing information such that the new source is added to a conference call.

22. The method of claim 21 further comprises the step of deleting, by at least one of said plurality of site interfaces, source information of a deleted source from the communication processing information such that the deleted source is deleted from the conference call.

* * * * *